United States Patent [19]
Reese et al.

[11] Patent Number: 5,265,518
[45] Date of Patent: Nov. 30, 1993

[54] DUAL BREWER FOR TEA AND COFFEE

[75] Inventors: Robert J. Reese, St. Charles; Andrew F. Poag, St. Louis, both of Mo.

[73] Assignee: Unidynamics Corporation, Stamford, Conn.

[21] Appl. No.: 971,932

[22] Filed: Nov. 5, 1992

[51] Int. Cl.⁵ .................... A47J 31/32; A47J 31/40
[52] U.S. Cl. .................... 99/280; 99/289 T; 99/290; 99/291; 99/302 R
[58] Field of Search ............ 99/279, 280, 287, 289 R, 99/289 T, 290, 291, 292, 195, 300, 302 R, 298, 316; 426/433

[56] References Cited

U.S. PATENT DOCUMENTS

| | | | |
|---|---|---|---|
| 2,702,000 | 2/1955 | Renner | 99/303 |
| 3,046,869 | 7/1962 | Reynolds | 99/289 |
| 3,149,556 | 9/1964 | Martin | 99/291 |
| 3,314,357 | 4/1967 | Valente | 99/291 |
| 3,446,137 | 5/1969 | Pryor et al. | 99/289 |
| 3,459,118 | 8/1969 | Hausam | 99/291 |
| 4,134,332 | 1/1979 | Merman | 99/289 T |
| 4,603,620 | 8/1986 | Daugherty | 99/300 |
| 4,757,754 | 7/1988 | Welker | 99/291 |
| 4,790,239 | 12/1988 | Hewitt | 99/279 |
| 4,791,859 | 12/1988 | King | 99/289 T |
| 4,825,758 | 5/1989 | Snowball et al. | 99/282 |
| 4,867,048 | 9/1989 | Brewer | 99/283 |
| 4,977,820 | 12/1990 | Lin | 99/323 |

Primary Examiner—Robert W. Jenkins
Attorney, Agent, or Firm—Senniger, Powers, Leavitt & Roedel

[57] ABSTRACT

A dual brewing system for a vending machine in which a pair of separate brewers are mounted for simultaneous movement through a brewing and dumping cycle even though only one of the brewers is actually used to brew a beverage, such as tea or coffee, at a time. A filter paper feed mechanism is provided for one of the brewers used primarily for coffee. The paper feed mechanism is controlled so that it is only advance after the brewer which it is associated with is used and not when the other brewer is used.

14 Claims, 9 Drawing Sheets

DUAL BREWER FOR TEA AND COFFEE

BACKGROUND OF THE INVENTION

The present invention relates to beverage brewers in general and, more particularly, to brewers of tea and coffee which brew a single cup on demand, for use in automatic vending machines.

The prior art brewing devices utilized in automatic vending machines for brewing and dispensing single cups of coffee and tea, on demand, either provide a single brewer for brewing either tea or coffee, depending on the customer's choice, or two completely separate brewers, one for tea and one for coffee, each with its own separate operating mechanism. One of the main problems of utilizing a single brewer to brew either tea or coffee as selected by a customer is taste contamination. For example, if the brewer has just been used to brew coffee and the next customer selects tea, the tea may have a coffee taste to it since there will always be a residual amount of brewed coffee in the brewer which will be swept into the cup and mixed with the tea.

A second problem with using a single brewer in an automatic vending machine involves proper adjustment of the brewing control equipment so as to brew acceptable tea or coffee. The size and volume of the coffee grounds for brewing acceptable coffee in an acceptable period of time differs significantly in most cases from the size and volume of tea grounds necessary to brew an acceptable cup of tea in a similar time. It has been known for some time that in order to reduce the brewing time of fresh ground coffee and tea to a short enough time that it is commercially acceptable in an automatic vending machine, at least part of the brewing process needs to be carried out under pressure so that as the beverage is expelled from the brewing chamber it is passed over the bed of granules or tea leaves at such a rate as to maximize the extraction of flavor into the beverage to be dispensed. However, the pressure differs markedly for the brewing of tea and coffee during essentially the same time period in this environment and adjustments have to be made when switching between the brewing of tea and coffee in the same brewer on subsequent vends from such machines in order to have an acceptable tasting commodity. The relative complexity of such equipment makes the machine more expensive and can result in poor control over the necessary formula of grounds, pressure and time and can result in an inferior brew of coffee or tea. In addition, the difference in fineness of the coffee grounds verses that of tea necessitates the use of a finer filter or screen than is needed or can be used to produce tea in an automatic vending machine environment. This requires a compromise in the mesh of the filter and the grind of the tea and coffee which results in poor quality of either brewed product.

The use of two completely separate brewers solves the taste contamination problem mentioned above, however, such a brewer is much more costly to construct since it doubles the amount of brewing equipment and its associated operating mechanisms. This can become prohibitively expensive. In addition, the use of two completely separate brewing systems is bulky and does not lend itself to packaging in a vending machine where space is at a premium.

SUMMARY OF THE INVENTION

The present invention overcomes the above described difficulties and disadvantages associated with the prior art devices by providing a single operating mechanism which contains two brewing chambers and their associated filtering systems and means for controlling them for making tea or coffee quickly and precisely. This system thus prevents contamination between the brewed coffee and tea, resulting in an efficient and cost effective dual brewing system.

The dual brewing system of the present invention is for use in a vending machine to separately brew two different beverages, and comprises a pair of beverage brewers, each having a brewing chamber, a liquid supply line, means for supplying a product to the brewing chamber, and a brewed beverage outlet, means for selecting which brewer is to be operated and for supplying liquid and product to the selected brewer, a cup station, means for supplying brewed beverage from either beverage outlet to the cup station for filling a cup, and mixing bowl means interconnected between the brewed beverage outlet line of at least one brewer and the cup station for mixing the brewed liquid with at least one selected condiment before supplying it to the cup station.

The dual brewing system also preferably includes the pair of beverage brewers each having a brewing chamber with separable upper and lower barrel portions and a bottom portion, each brewer further having a filter means associated therewith for preventing the product from entering the brewed beverage outlet, a stationary frame to which the upper barrel portions of both brewers are mounted, a first movable frame member to which the lower barrel portions of both brewers are mounted for movement therewith, a second movable frame member to which the bottom portions of both brewers are mounted for movement therewith, means mounting the first movable frame member for movement between a first position in which the lower barrels are disposed to receive product from the product supply means, a second position in which the lower barrels are aligned with their respective upper barrels and a third position in which the lower barrels are substantially inverted for dumping used product therefrom, and means mounting the second movable frame member for movement between a first position in which the respective lower portion of each brewer is disposable between the respective upper portion and bottom portion when the lower barrels are in their second position, and a second position in which the bottom portion, lower barrel portion and upper barrel portion are in sealing engagement for brewing.

In addition, the dual brewing system preferably includes a filter paper supply means associated with at least one brewer for passing a continuous supply of filter paper between the lower portion and the bottom portion thereof when the second movable frame structure is in the first position, and the supply means being stopped when the bottom portion, lower barrel portion and upper barrel portion are in sealing engagement for brewing. It also preferably includes an intermittent drive means for advancing the filter paper when the first movable frame structure is moving from the second position to the third position.

DETAILED DESCRIPTION OF THE PREFERRED EMBODIMENT

Figure 1:
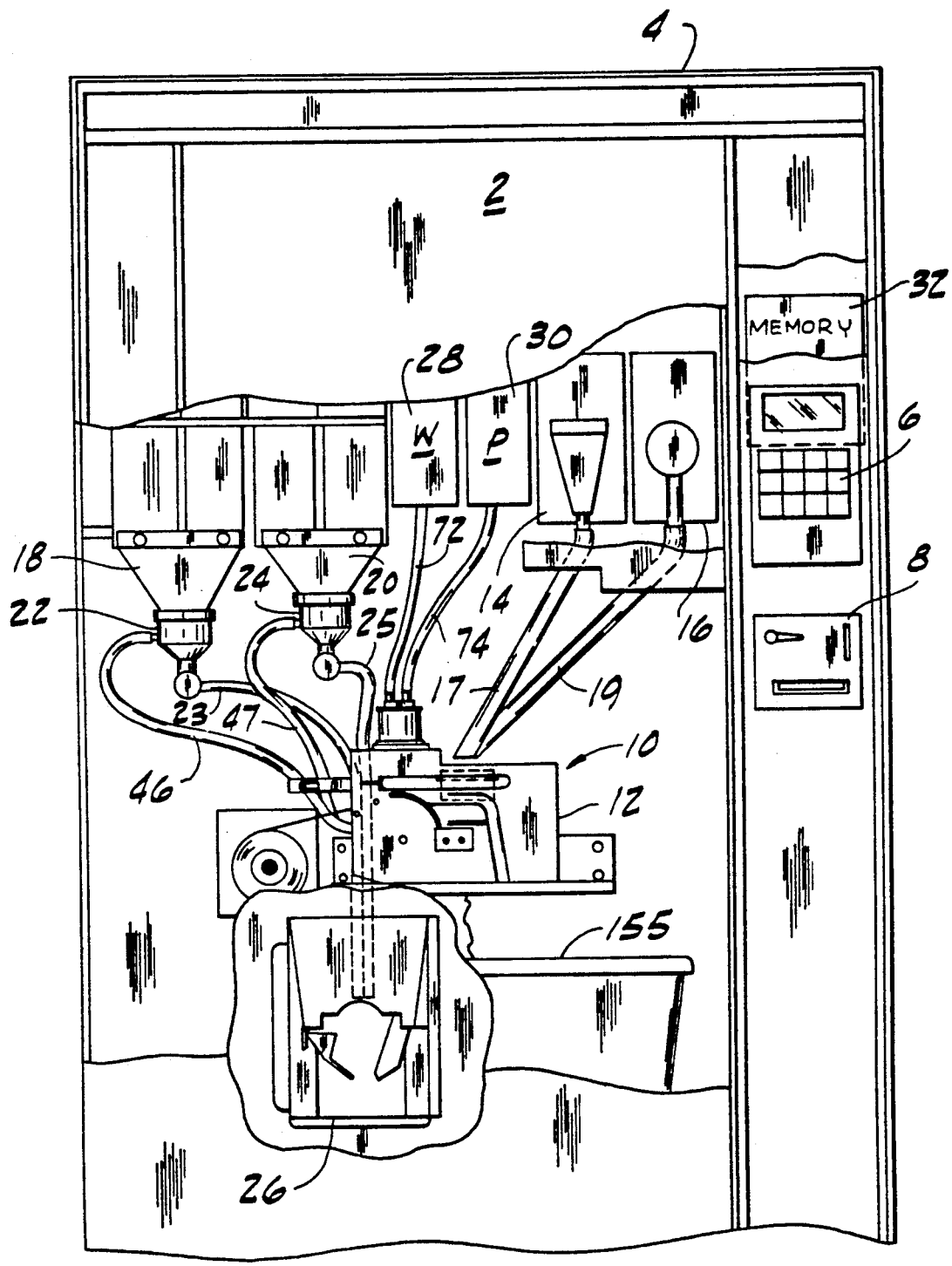
FIG. 1 is a front view of a vending machine partially cut away to show internal components thereof.

Referring to the drawings, and more particularly to FIG. 1, a hot beverage vending machine 2 is shown generally comprising a cabinet 4 with a beverage selection key board panel 6, a coin deposit and coin return panel 8, all of well known construction and commonly used on vending machines in general. Contained within the cabinet 4 is the dual brewing system of the present invention, generally referred to by the numeral 10.

The dual brewing system 10 consists mainly of the dual brewing apparatus 12 which is removably mounted to the back of the cabinet 4, product storage and supply devices 14 and 16 which are used to store and supply tea and coffee to the brewing apparatus 12 through lines 17 and 19, respectively, condiment storage and supply devices 18 and 20 which supply such things as powdered cream and sugar to one or more mixing bowls, such as bowls 22 and 24, and a cup stand 26 to which the final beverage is dispensed into a cup. In addition, a hot water supply 28 is provided to supply hot water to the brewing apparatus 12 and a pressure source 30 is provided to supply air under pressure to the brewing apparatus. All of the operations and functions of the vending machine 2, including operation of the dual brewing system 10, are preferably controlled by a preprogrammed microprocessor 32, all as explained in more detail below.

Figure 5:
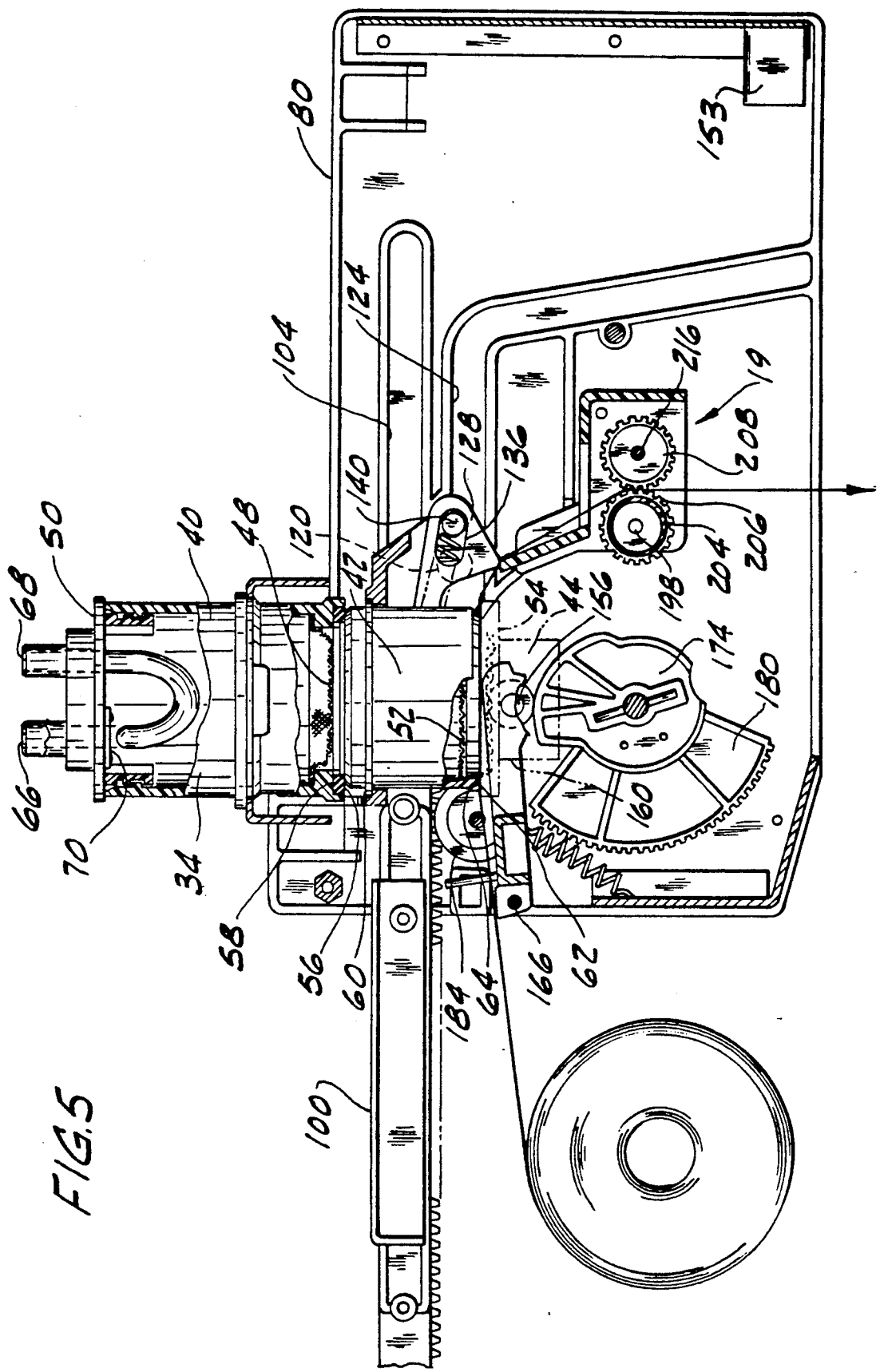
FIG. 5 is a right side cross-sectional view similar to FIG. 3, but with the components in position for brewing.

The dual brewing apparatus 12 is shown in more detail in FIGS. 2-9, and has two beverage brewers 34 and 36 which are identical except as noted below. As best seen in FIG. 5, each brewer has an upper cylindrical barrel portion 40, a lower cylindrical barrel portion 42 and a bottom generally internally funnel-shaped portion 44. The upper barrel portion is provided with a filter screen 48 in its bottom of relative coarse mesh, such as 80 mesh screen for coffee or tea, and is closed by a cap 50 at its upper end which has a sealing gasket 51 which engages and seals with the inner surface of upper portion 40 when the cap is assembled to the upper portion 40. Lower portion 42 is provided with a filter screen 52 of relatively fine mesh, such as 208 mesh for coffee and 40 mesh with a tea basket insert (not shown) for reducing the screen area for tea. The bottom portion 44 is also provided with a filter screen 54, also of relatively coarse mesh, such as 80 mesh, for both coffee and tea. An annular seal 56 is seated in groove 58 formed in the bottom edge of upper portion 40 and engages a sealing lip 60 formed in the top of lower portion 42 when the brewer is closed. A similar annular seal 62 is mounted in an annular groove formed in the top of bottom portion 44 and engages a sealing lip 64 formed in the bottom of lower portion 42 when the brewer is closed. The volume of the inside of the upper and lower portions 40 and 42 provides a brewing chamber for approximately a single cup of brewed beverage including a charge of product, such as tea leaves or coffee grounds, in the lower portion 42.

The cap 50 provides a hot water inlet 66 and a pressurized air inlet 68. A flexible flat seal 70 normally covers the inner opening of the hot water inlet 66 and is flexed out of the way by the incoming stream of water. The pressure inlet 68 is provided with a U-shaped tube at its end which generally directs the incoming high pressure air stream against the inside of the seal 70 to assist in maintaining a tight seal on the water inlet 66 when the high pressure air is being supplied to inlet 68. A hot water line 72 connects the hot water supply 28 to the inlet 66 and an air pressure line 74 connects the high pressure air supply 30 to the air inlet 68. It is to be noted that the high pressure air supply 30 is shown schematically as a tank, however, it is contemplated that it can be a motor/compressor arrangement or other means of supplying air under pressure, if desired.

Both of the upper portions 40 of brewers 34 and 36 are mounted in a plate 76 secured between the main side walls 78 and 80 by bolts 82 and 84 which are spring biased downward by springs 86 and 88 which allows the plate 76 some freedom of upward movement, mainly for sealing pressure, in response to the seating of the lower and bottom portions 42 and 44 during the brewing phase, as described in more detail below. The lower portions 42 of the brewers 34 and 36 are mounted in another plate 90 carried by a pair arms 92 and 94. Plate 90 is pivotally supported at its rearward end to one end of each of the arms 92 and 94 and the opposite ends of the arms are pivotally mounted to a horizontally disposed rod 96 which has its ends pivotally mounted in respective horizontal slide members 98 and 100 for movement therewith. Slide members 98 and 100 are captive for movement in horizontal tracks 102 and 104 formed in the side walls 78 and 80. A front pair of rollers 106 and 108 are mounted to stub shafts fastened to the front ends of slide bars 98 and 100 and ride in the horizontal tracks 102 and 104. A rear pair of rollers 110 and 112 are mounted to stub shafts in the rear of side walls 78 and 80 aligned with the tracks 102 and 104 and ride in tracks 114 and 116 formed, respectively, in slide members 98 and 100 so that the slide members 98 and 100 move horizontally.

Figure 6:
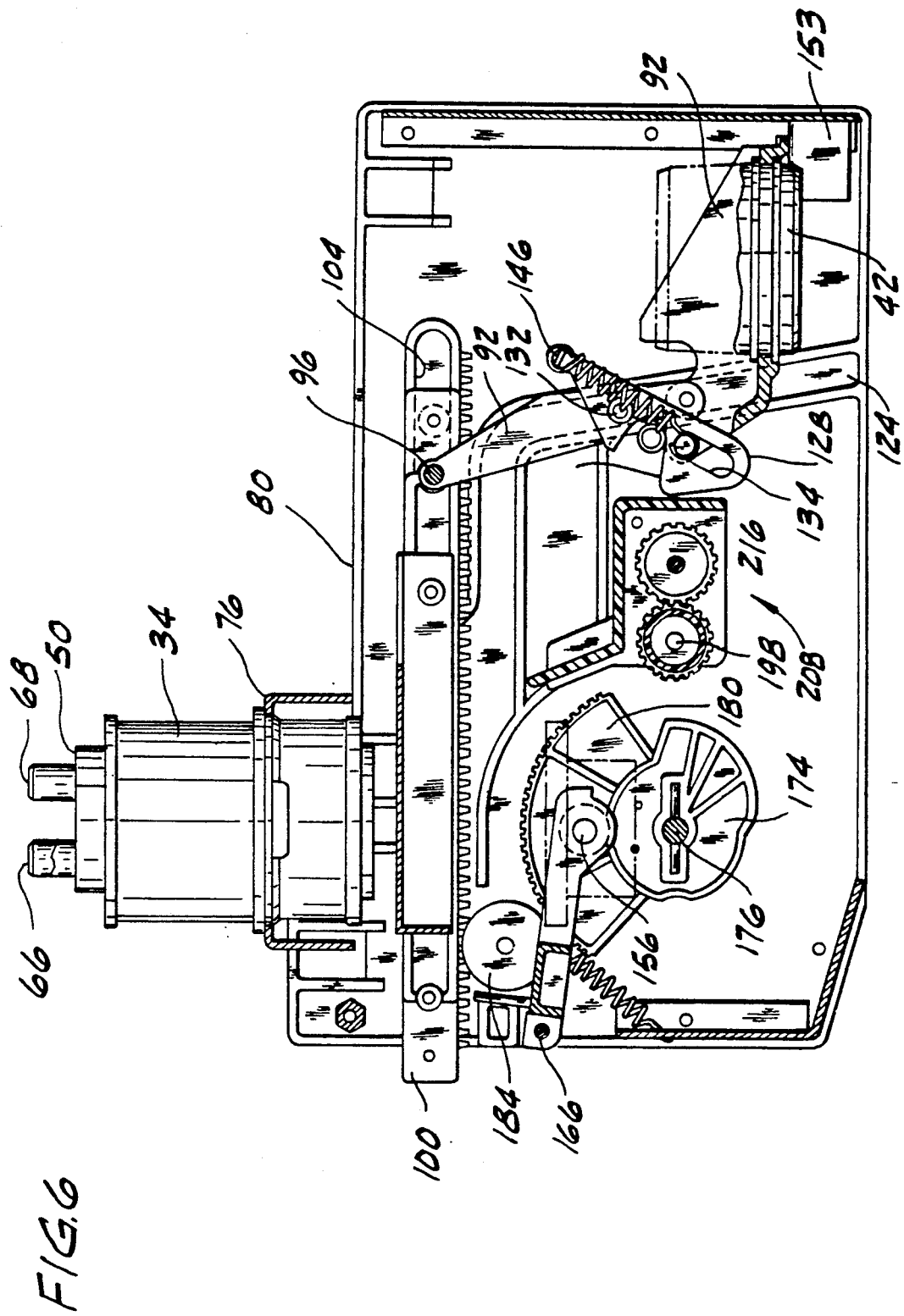
FIG. 6 is a side cross-sectional view similar to FIG. 3, but with the components in position for emptying the grounds from the lower portion of the brewer.
Figure 7:
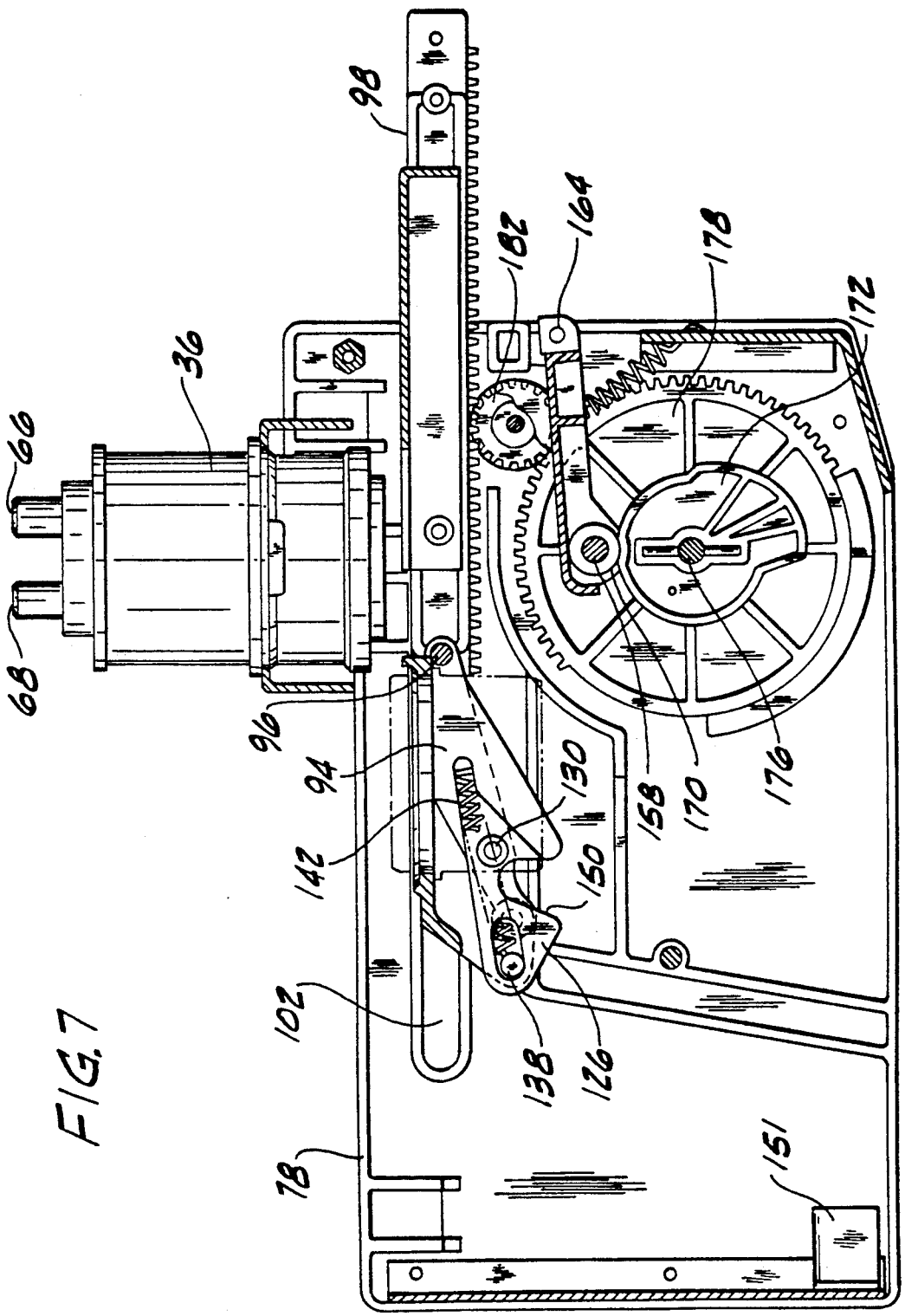
FIG. 7 is a left side cross-sectional view of the brewing apparatus shown in the product loading position.

The front end of plate 90 is provided with a pair of rollers 118 and 120 which ride in tracks 122 and 124 formed in the side walls 78 and 80. Tracks 122 and 124 extend horizontally from the rear portion of the side walls 78 and 80 toward the front where they turn downward at 80 degrees toward the bottom edge of the side walls so that as the plate 90 is moved forward it is tilted downward as shown in FIG. 6.

A pair of trip levers 126 and 128 are mounted for pivotal movement at their mid-portions to pins 130 and 132 fixed to the arms 92 and 94 at their mid-portions. The front ends of trip levers 126 and 128 are provide with respective slots 134 and 136 which receive respective pins 138 and 140 mounted to the front end of plate 90 inboard of the rollers 118 and 120. A pair of slightly tensioned springs 142 and 144 extend between and are fixed to the pins 130 and 132 on one end thereof and to tabs 146 and 148 on the ends of trip levers 126 and 128 on their other ends. Notches 150 and 152 are formed in the mid-portion of trip levers 126 and 128 and engage a shaft 154 mounted to and extending between the forward portion of the side walls 78 and 80 adjacent the downward extending portion of the tracks 122 and 124 when the rollers 118 and 120 move down that portion of the tracks 122 and 124.

The two bottom internally funnel-shaped portions 44 are formed, for example, of a single molded piece of plastic forming base member 160. Base member 160 is pivotally mounted by pins 156 and 158 in a base plate 162. The base member is resiliently supported such as by springs so as to remain in a substantially horizontal position in the base plate 162 which extends substantially the distance between the side walls 78 and 80 and is mounted at its rear by a pair of pins 164 and 166 fixed in the side walls so as to allow plate 162, and thus base member 160, to be pivoted slightly towards and away from the upper barrel portions 40 with which the bottom funnel-shaped portions 44 are aligned. Mounted concentric with the pins 156 and 158 are a pair of spaced apart cam followers or rollers 168 and 170 which ride on the respective surfaces of cams 172 and 174 which are, in turn, mounted for rotation on a common drive shaft 176. Drive shaft 176 is connected to a reversible drive motor (not shown). Cams 172 and 174 are identical and raise and lower the bottom portion in phase with other portions of the brewers 34 and 36 as described in more detail below.

Also mounted to drive shaft 176 are two sector gears 178 and 180. Sector gear 178 engages pinion gear 182 mounted for rotation to the side wall 78, and which, in turn, engages rack gear 186 formed in slide bar 98 for sliding the slide bars 98 and 100 horizontally in phased relation to movements of other portions of the brewing apparatus during the brewing cycle. Mounted in the central region of the brewing apparatus 12 is a paper feed mechanism shown generally as 190 and best seen in FIGS. 3, 4 and 8. The paper feed mechanism is designed to feed a continuous strip of filter paper 192 supplied in a roll 194 removably mounted adjacent the rear portion of the brewing apparatus 12 when mounted in the vending machine 2. The filter paper 192 is slightly wider than the width of a brewer, such as brewer 36, and is aligned with only one of the brewers so that it can be fed between the lower portion 42 of brewer 36 and the bottom portion 44 of brewer 36 in such a way that these portions close on and seal about the filter paper during the brewing process.

The paper feed mechanism 190 is driven by the sector gear 180 through engagement with a drive gear 196 mounted for independent rotation on a shaft 198. A drive bushing 200 is coupled to the drive gear 196 through a one-way clutch 202 which are concentrically mounted with shaft 198 and the bushing is coupled to a paper feed cylinder 204 for rotation therewith when clutch 202 is engaged. Formed in the periphery of paper feed cylinder 204 at each end thereof are feed teeth 206 for engaging and feeding the filter paper. The feed teeth 206 also engage similar teeth 208 formed in the periphery of a pair of pinch rolls 210 and 212 against which the feed cylinder is biased so as to grip the filter paper and advance it at the appropriate point in the brewing cycle. The paper feed cylinder is biased against the pinch rolls 210 by means of springs 214 disposed at each end of the shaft 216 on which the pinch rolls are mounted and keeps the teeth 208 in engagement with the teeth 206 on the feed cylinder. The ends of the shafts 216 and 198 are mounted in the side 80 and a bracket 218 which extends from the side wall 78.

Since it is not necessary to advance the filter paper 192 when brewer 34 is being utilized, as opposed to brewer 36 with which the filter paper is associated, provision is made for disengaging the paper feed mechanism when brewer 34 is being used. This is achieved by mounting the gear 196, clutch 202 and drive bushing 200 for sliding movement along the shaft 198 so that gear 196 can be disengaged laterally from sector gear 180. A solenoid 220 is provided to engage push rods 222 which in turn engage the side of gear 196 to push it out of engagement with sector gear 180. A spring 224 normally biases gear 196 into engagement with sector gear 180.

Referring now to the operation of the device, the vending machine 2 is operated in the standard well known manner by first inserting currency such as coins into the coin mechanism 8 to establish credit. A selection is then made on the keyboard 6 which corresponds to a menu (not shown) that illustrates the various choices, for example, tea plain or with sugar, cream or sweetener, or coffee plain or with sugar, cream, or sweetener. This information is input into the microprocessor 32 which is preprogrammed to control the various functions of the vending machine 2 as described below. The programming and operation techniques are well known to those skilled in the art and will, therefore, not be explained in detail herein, but basically cause operation of the various motors and solenoids in the required sequence in order to perform the operations of the equipment as described below.

Figure 2:
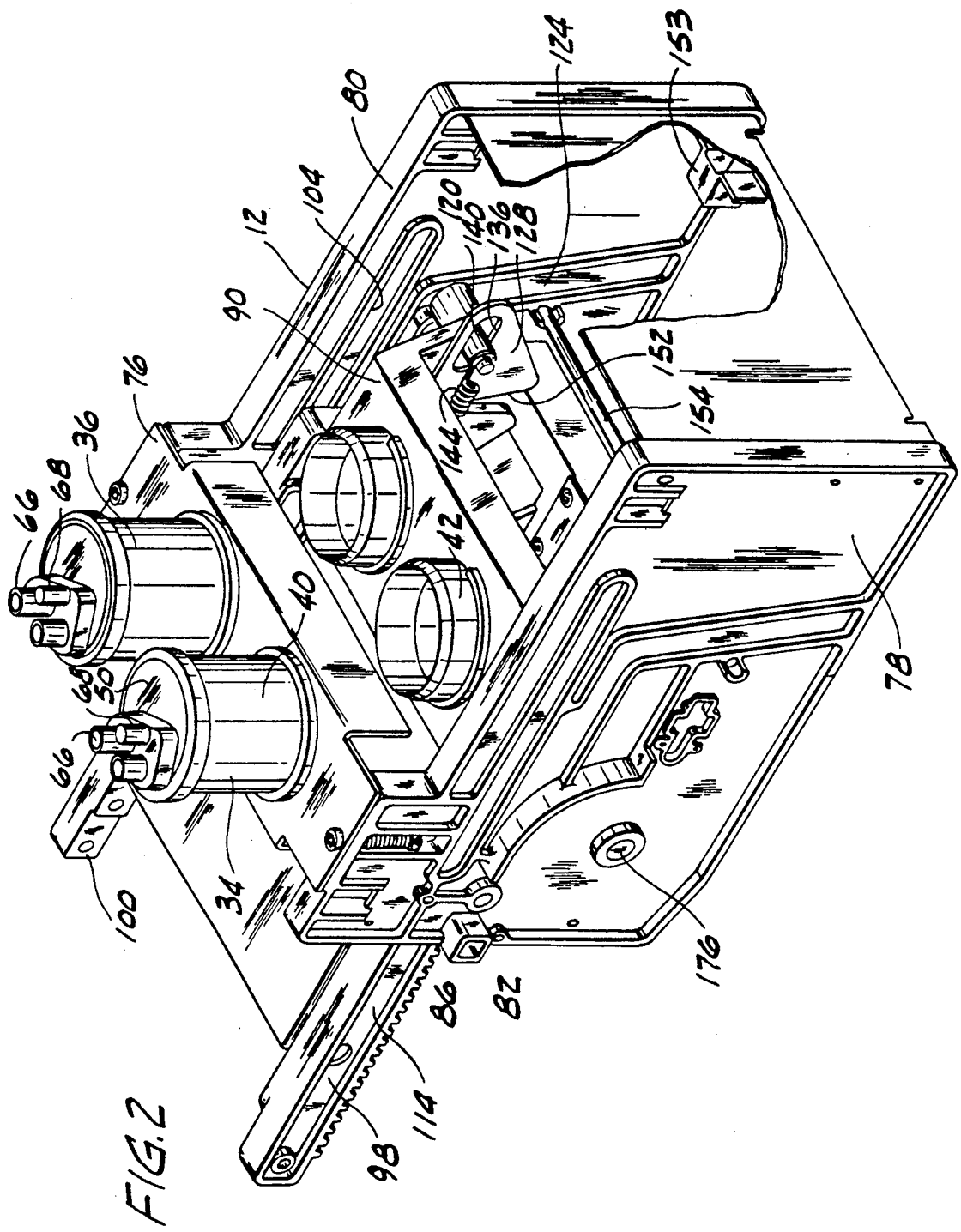
FIG. 2 is a pictorial view, partially cut away, showing the preferred embodiment of dual brewing apparatus of the present invention.

Once a selection has been made on the keyboard 6, the proper amount of tea or coffee is expelled from the product storage and supply devices 14 or 16, depending upon whether tea or coffee is desired, and deposited through the lines 17 or 19, respectively, into beverage brewer 34 and 36. Since the subsequent sequence of operation for brewing either tea or coffee is essentially the same, the following sequence of steps will be described with respect to the brewing of coffee and where an exception with respect to the manner in which tea is brewed exists, it will be noted at that point in the sequence. When the coffee is deposited from the product supply device 16 through the line 19 into the lower cylindrical barrel portion 42 of beverage brewer 36, the lower portion 42 is in the position shown in phantom in FIG. 1 and as shown in FIG. 2. This is the normal rest position for the dual brewing apparatus 12 when not in use. Once the proper measure of coffee has been deposited in the lower portion 42 of beverage brewer 36, the microprocessor 32 activates the drive motor which is in engagement with the main drive shaft 176, causing the sector gears 178 and 180 secured to the drive shaft 176 for rotation therewith, to rotate clockwise in the direction shown in FIG. 3. This, in turn, causes the pinion gears 182 and 184 to rotate which, through their engagement with the rack gears 186 and 188, respectively, cause the slide bars 98 and 100 to move rearwardly, thus positioning the lower barrel portion 42 beneath the upper barrel portion 40 of brewer 36 as shown in FIG. 5.

As previously mentioned, the cams 172 and 174 are also secured to drive shaft 176 for rotation therewith and thus, as the lower Portion 42 of beverage brewer 36 is moved into position beneath the upper barrel portion 40 the bottom portion 44 supported by the plate 162 is pivoted upwardly through action of the cam followers 168 and 170 riding on the surfaces of the cams 172 and 174. As seen in FIG. 5, the cams are so constructed and arranged as to cause the bottom funnel-shaped portion 44 to engage and seal against the lower edge of the lower portion 42 which, in turn, forces the lower portion 42 into sealing engagement with the bottom of the upper portion 40. The shaft 176 is maintained in this position so that the brewer 36 remains closed for the brewing cycle.

Once the beverage brewer 36 is in the closed and sealed position as shown in FIG. 5, the proper measured amount of hot water is dispensed from the hot water tank 28 through line 72 into the brewer 36. The water passes through the filter screen 48 and over the coffee grounds contained in the lower portion 42 and then through the filter screen 52 in the bottom of lower portion 42, and then through the filter screen 54 in the bottom funnel-shaped portion 44. Since the outlet line 47 from brewer 36 extends upwardly toward the mixing bowl 24, it provides a trap so that the water does not flow immediately out of the brewer 36 and thus is allowed to rest on the coffee grounds and absorb the coffee and flavor therefrom. After the desired steep time has been reached, pressurized air from the pressure supply 30 is injected through the air inlet 68 into the upper portion 40 of brewer 36. The lower end of the air inlet 68 inside the brewer is U-shaped as described above, and is turned with its outlet end facing towards the seal 70 so that the air pressure causes the seal to fit tightly against the water inlet so that air does not escape through the upper portion of the brewer. As the air pressure builds within the brewer, it forces the water and now steeped coffee out through the lower portion of the brewer and through the bottom portion 44 through the various screens 44, 52 and 54 and into the outlet line 47. It is then passed from the outlet line 47 into the mixing bowl 24 where the microprocessor correctly times the release of the desired condiments from the condiment supply 20, such as sugar, cream in powdered form, or non-sugar sweetener, as desired. It is then mixed in the mixing bowl in a well known manner, and passes through the outlet line 25 into the cup stand 26 where it is deposited in a cup which is previously been placed in the cup stand by a cup release mechanism well known in the art.

Figure 3:
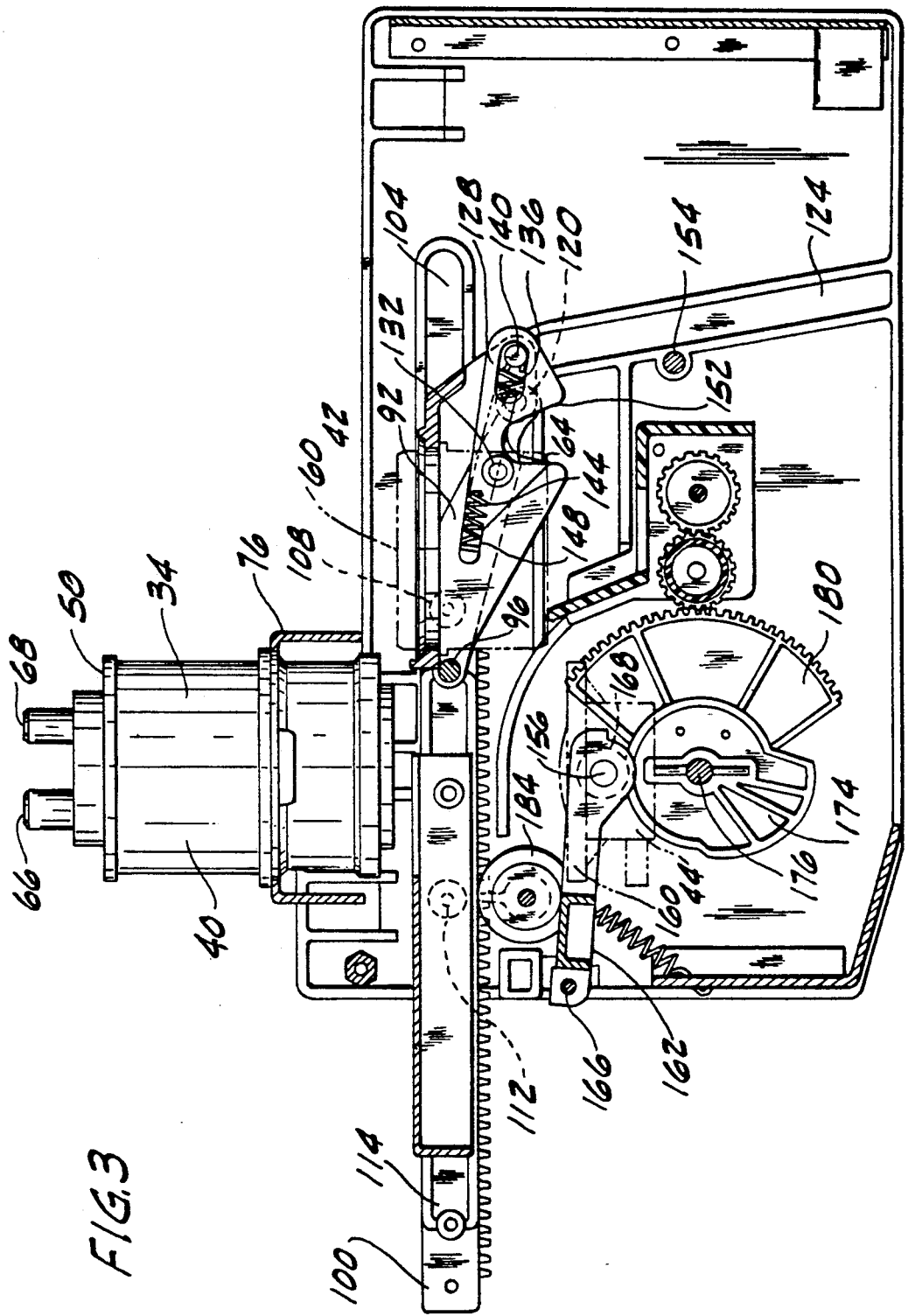
FIG. 3 is a right side cross-sectional view of the dual brewing apparatus showing the position of components when the device is in a product fill position.
Figure 4:
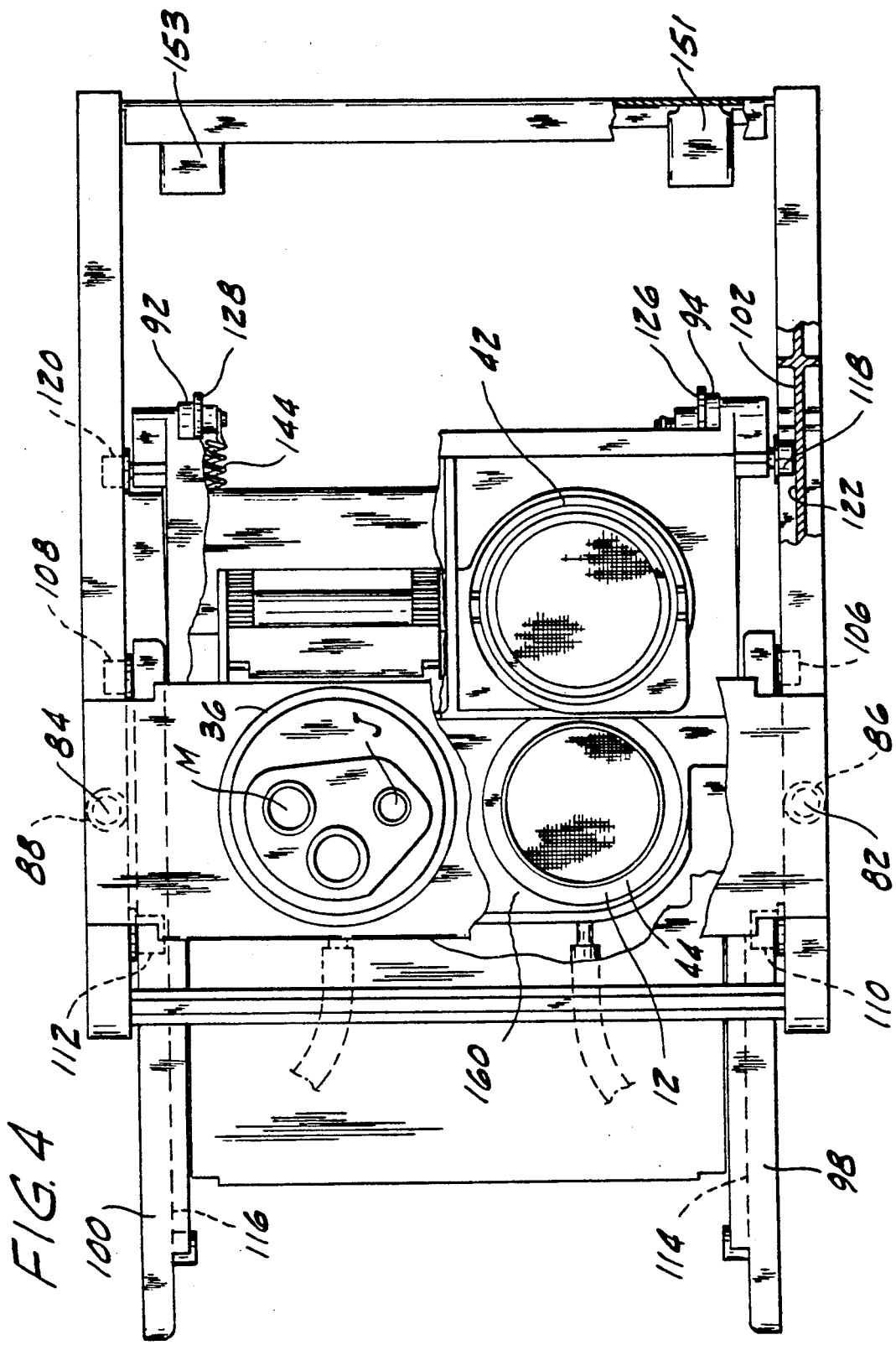
FIG. 4 is a top plan view partially cut away and in partial cross-section of the dual brewing apparatus.

After the brewed beverage has been expelled from the brewer 36 by the air pressure, the drive motor engaging the main drive shaft 176 is reversed, causing the cams 172 and 174 to reverse thus allowing the bottom funnel-shaped portion 44 to fall away from the lower end of the lower portion 42 which then disengages slightly from the bottom of the upper portion 40 of brewer 36. As the bottom funnel-shaped portion 44 falls away from the lower cylindrical barrel portion 42, the sector gear 178 through pinion gear 182 causes the sliding movement of slide bars 98 and 100 that carry the lower barrel portion 42 to the right as shown in FIGS. 3 and 6. As the slide bars move to the right as shown in these figures, the rollers 118 and 120 riding in tracks 122 and 124 enter the downwardly turned portion causing the plate 90 to be tilted towards the right as this downward motion continues, the trip levers 126 and 128 engage the shaft 154 in the notches 150 and 152 so that the trip lever is rotated to the right as shown in FIG. 6 causing the pins 138 and 140 to slide in the slots 134 and 136 which causes the plate 90 carrying the lower barrel portion 42 to rotate to the position shown in FIG. 6 so that the barrel portion is inverted. It then slaps against the stops 151 and 153, jarring the grounds out of the lower portion 42 into a receptacle 155, as shown in FIG. 1.

After momentary stop of the drive motor with the lower barrel portion 42 disposed in the dumping position as illustrated in FIG. 6, the drive motor is again reversed so that the slide members 98 and 100 draw the lower barrel portion 42 back into its rest position as shown in FIGS. 2 and 3 where it is ready to receive a subsequent charge of product.

Simultaneously with the rearward movement of the slide members 98 and 100 to dump the grounds from the lower portion 42, the filter paper mechanism is operated to move the used portion of the paper, which was within the brewer 36 during the previously described brewing process, out of alignment with the brewer and to bring a clean portion of the filter paper into position for the subsequent brewing cycle. As the sector gear 180 rotates to move the slide member 100 for dumping the lower portion 42 of brewer 36 it also engages drive gear 196 of the paper feed mechanism 190 causing rotation thereof and which, through the clutch 202 in turn causes rotation of the paper feed cylinder 204 which pinches the filter paper between it and the pinch rolls 210 to advance the filter paper.

Figure 8:
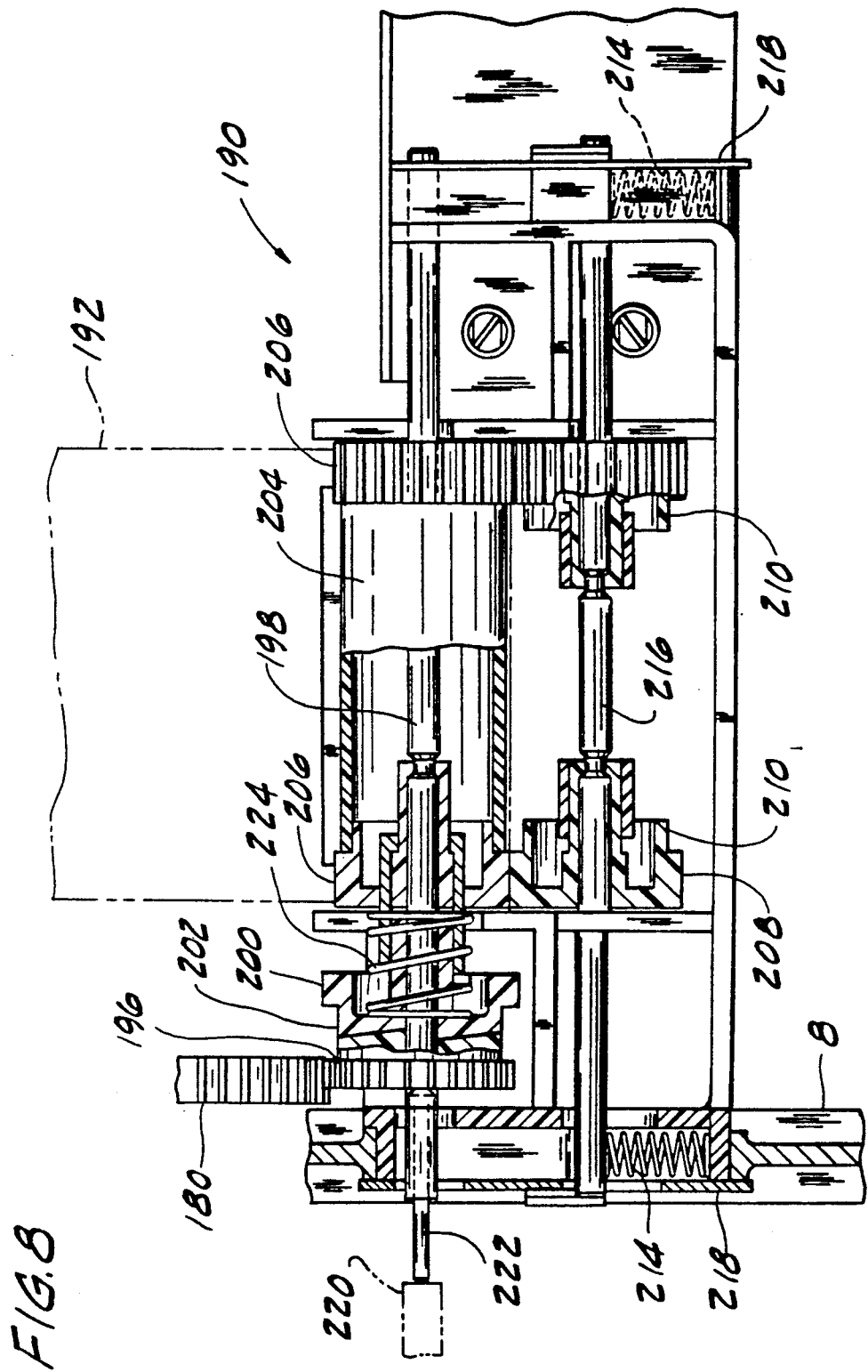
FIG. 8 is a bottom partial cross-sectional view of the lower portion of the brewing apparatus showing the filter paper feed mechanism.
Figure 9:
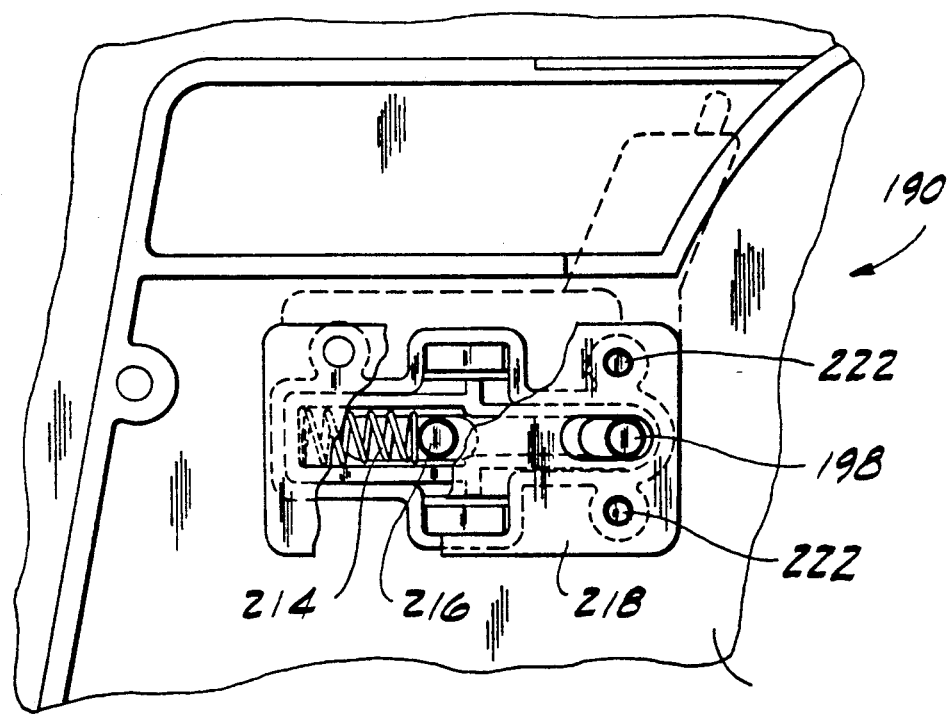
FIG. 9 is a partial side view showing the spring biasing mechanism for the paper filter feed rollers.

As previously mentioned, if the brewer 34 is being utilized to brew tea, then it is desirable to disengage the filter paper feed mechanism 190 so as not to waste the filter paper since during use of the brewer 34 the brewer 36 is dormant. The microprocessor thus causes the solenoid 220 to push the push rods 222 to the right as shown in FIG. 8 to disengage the clutch mechanism so that although the sector gear 180 continues to rotate the drive gear 196 it does not cause rotation of the feed cylinder 204, and thus does not cause feeding of the filter paper. After the sector gear 180 has reached the end of its rotation which is when the lower barrel portion 42 is in its dump position as shown in FIG. 6, the solenoid 220 is disengaged so that the clutch 202 reengages. As the sector gear 180 rotates in the opposite direction, it does not operate the one-way clutch 202 as the sector gear through the slide bar 100 brings the lower portions 42 back into their ready position as shown in FIG. 2.

Thus it can be seen, that an efficient and effective brewing apparatus is provided which allows the brewing of tea or coffee without cross-contamination of the chosen beverage. It is to be noted that it is also contemplated that rather than using tea, a decaffeinated coffee and regular coffee could be provided in the dual brewers.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A dual brewing system for use in a vending machine to separately brew two different beverages, comprising:
- a pair of beverage brewers, each having a brewing chamber, a liquid supply line, means for supplying a product to the brewing chamber, and a brewed beverage outlet;
- means for selecting which brewer is to be operated;
- means for supplying liquid and product to the selected brewer;
- a cup station;
- means for supplying brewed beverage from either liquid outlet to the cup station for filling a cup; and
- mixing bowl means interconnected between the brewed beverage outlet line of at least one brewer and the cup station for mixing the brewed beverage from the at least one brewer with at least one selected condiment before supplying it to the cup station.

2. A dual brewing system as defined in claim 1 and further including:
- the pair of beverage brewers each having the brewing chamber with separable upper and lower barrel portions and a bottom portion, each brewer further having a filter means associated therewith for preventing the product from entering the brewed beverage outlet;
- a stationary frame to which the upper barrel portions of both brewers are mounted;
- a first movable frame member to which the lower barrel portions of both brewers are mounted for movement therewith;
- a second movable frame member to which the bottom portions of both brewers are mounted for movement therewith;
- means mounting the first movable frame member for movement between a first position in which the lower barrels are disposed to receive product from the product supply means, a second position in which the lower barrels are aligned with their respective upper barrels and a third position in which the lower barrels are substantially inverted for dumping used product therefrom; and
- means mounting the second movable frame member for movement between a first position in which the respective lower portion of each brewer is disposable between the respective upper portion and bottom portion when the lower barrels are in their second position, and a second position in which the bottom portion, lower barrel portion and upper barrel portion are in sealing engagement for brewing.

3. A dual brewing system as defined in claim 2 wherein said filter means includes:
- filter paper supply means associated with at least one brewer for passing a continuous supply of filter paper between the lower portion and the bottom portion thereof when said second movable frame structure is in said first position, and said supply means being stopped when the bottom portion, lower barrel portion and upper barrel portion are in sealing engagement for brewing.

4. A dual brewing system as defined in claim 3 wherein said filter means includes:
- an intermittent drive means for advancing the filter paper when the first movable frame structure is moving from the second position to the third position.

5. A dual brewing system as defined in claim 1, including means for heating the liquid to the desired brewing temperature prior to its entering the brewing chamber.

6. A dual brewing system as defined in claim 1, including means for pressurizing the brewing chamber during brewing.

7. A dual brewing system for use in a vending machine to separately brew two different beverages, comprising:
- a pair of beverage brewers, each having a brewing chamber with separable upper and lower barrel portions and a bottom portion, a liquid supply line, means for supplying a product to the brewing chamber and a brewed beverage outlet, each brewer further having a filter means associated therewith for preventing the product from entering the brewed beverage outlet;
- a stationary frame to which the upper barrel portions of both brewers are mounted;
- a first movable frame member to which the lower barrel portions of both brewers are mounted for movement therewith;
- a second movable frame member to which the bottom portions of both brewers are mounted for movement therewith;
- means mounting the first movable frame member for movement between a first position in which the lower barrels are disposed to receive product from the product supply means, a second position in which the lower barrels are aligned with their respective upper barrels and a third position in which the lower barrels are substantially inverted for dumping used product therefrom; and
- means mounting the second movable frame member for movement between a first position in which the respective lower portion of each brewer is disposable between the respective upper portion and bottom portion when the lower barrels are in their second position, and a second position in which the bottom portion, lower barrel portion and upper barrel portion are in sealing engagement for brewing.

8. A dual brewing system as defined in claim 7 wherein said filter means includes:
- filter paper supply means associated with at least one brewer for passing a continuous supply of filter paper between the lower portion and the bottom portion thereof when said second movable frame structure is in said first position, and said supply means being stopped when the bottom portion, lower barrel portion and upper barrel portion are in sealing engagement for brewing.

9. A dual brewing system as defined in claim 8 wherein said filter means includes:
- an intermittent drive means for advancing the filter paper when the first movable frame structure is moving from the second position to the third position.

10. A dual brewing system as defined in claim 7, including means for heating the liquid to the desired brewing temperature prior to its entering the brewing chamber.

11. A dual brewing system as defined in claim 10, including means for pressurizing the brewing chamber during brewing.

12. A dual brewing system for use in a vending machine to separately brew two different beverages, comprising:
- a pair of beverage brewers, each having a brewing chamber formed with a removable bottom portion, a liquid supply line, means for supplying a product to the brewing chamber and a brewed liquid outlet;
- means mounting the bottom portion of at least one of the brewers for movement towards and away from its respective brewing chamber so as to be in spaced relation; and
- filter paper supply means associated with the at least one brewer for passing a continuous supply of filter paper between the brewing chamber and the bottom portion thereof when in said spaced relation, said supply means being operable to feed the paper when the bottom portion is in said spaced relation and being stopped when the bottom portion closes against the brewing chamber with the filter paper therebetween.

13. A dual brewing system as defined in claim 12, including means for heating the liquid to the desired brewing temperature prior to its entering the brewing chamber.

14. A dual brewing system as defined in claim 13, including means for pressurizing the brewing chamber during brewing.

* * * * *